Feb. 25, 1930.  J. L. DAVITT ET AL  1,748,541
OIL TANK SEPARATOR
Filed March 27, 1929  2 Sheets-Sheet 1
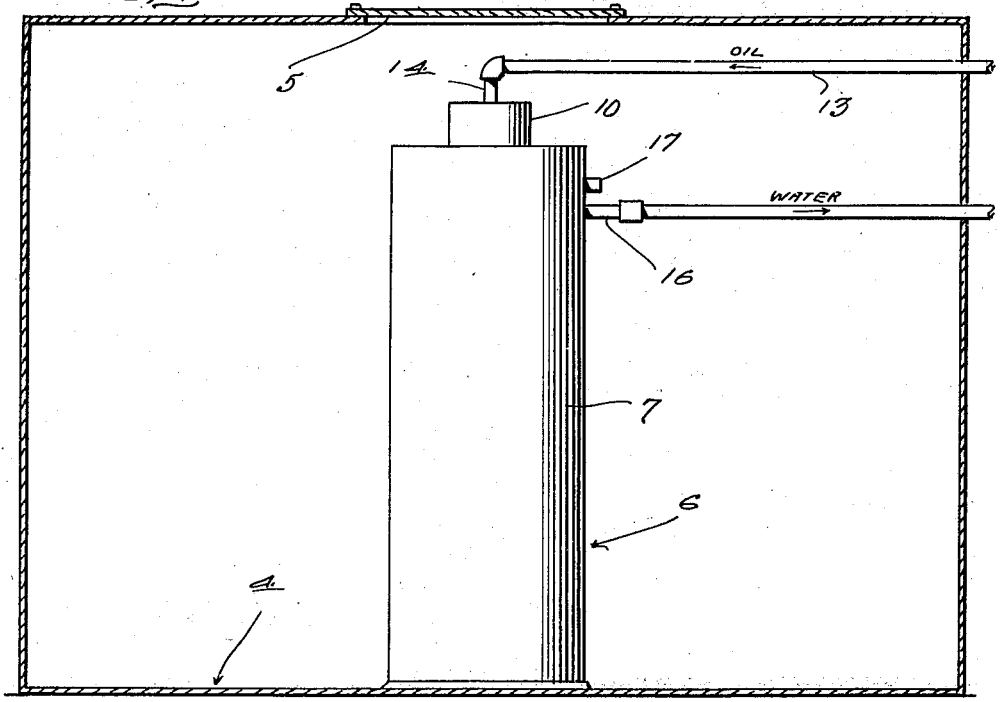
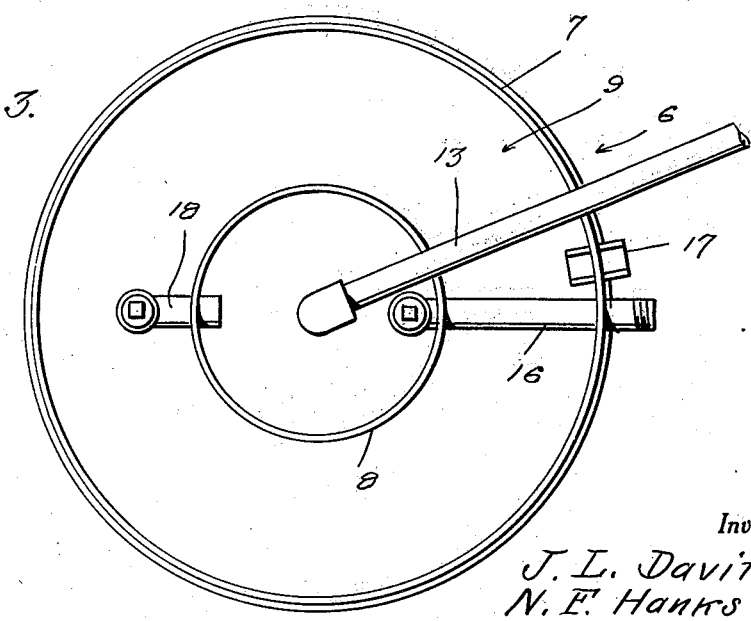
Inventors
J. L. Davitt
N. E. Hanks
By Clarence A. O'Brien
Attorney Patented Feb. 25, 1930

1,748,541

UNITED STATES PATENT OFFICE

JOHN L. DAVITT AND NORMAN K. HANKS, OF DUKE CENTER, PENNSYLVANIA

OIL-TANK SEPARATOR

Application filed March 27, 1929. Serial No. 350,280.

This invention relates to an improved appliance constructed for installation in oil containing tanks, said appliance being constructed to provide what may be broadly defined as a separator and the same functioning automatically to separate oil and water.

The device has been designed for use in the local oil fields where many of the wells simultaneously pump oil and water. It is a matter of common knowledge that the separating of oil from water has always been a source of considerable trouble, especially in the winter time when low temperature is apt to cause freezing of the water and consequent failure of the types of separating devices now used.

What we contemplate is a simplified and economical separator for installation inside of the tank wherein the separator is so made as to separate the water from the oil, to carry the water to a suitable source of discharge and to allow the oil to overflow into the containing tank.

It is advisable, perhaps, to recite here at the outset of this description that we are aware of the fact that the principle upon which the separator works has, of course, been used in this and other oil fields from time immemorial.

The novelty in the present improvement is predicated upon the use of a separator within the storage tank and the making of the separator of inner and outer cylindrical receptacles, the separating of the water and oil taking place in the inner receptacle, and the separated oil flowing from the inner receptacle to an encasing outer receptacle to there operate as an insulating sheathing of oil. The result is that freezing in cold weather would be obviated. This would effect a saving of tanks and pipe lines by preventing the usual damages resulting from the freezing thereof and an incalculable saving to the industry of the oil which is now lost from each tank when water is drawn therefrom by the old manual method. It will also effect other savings and conveniences such as will be apparent to those skilled in the art to which the invention relates.

Here be it noted, that in order to obtain efficient separation of oil from water, a certain temperature must be achieved or maintained. We hope to show that by this process the geo-thermal quality of earth heat of the fluid is preserved to a degree which promotes separation of all but twenty one-hundredths of one per-cent of water and that this is accomplished in a purely automatic manner which is entirely new.

In the drawings:

Figure 1 is a sectional view of an ordinary oil storage containing tank, showing the improved oil and water separating device located therein.

Figure 3 is a top plan view of Figure 2.

Figure 2:
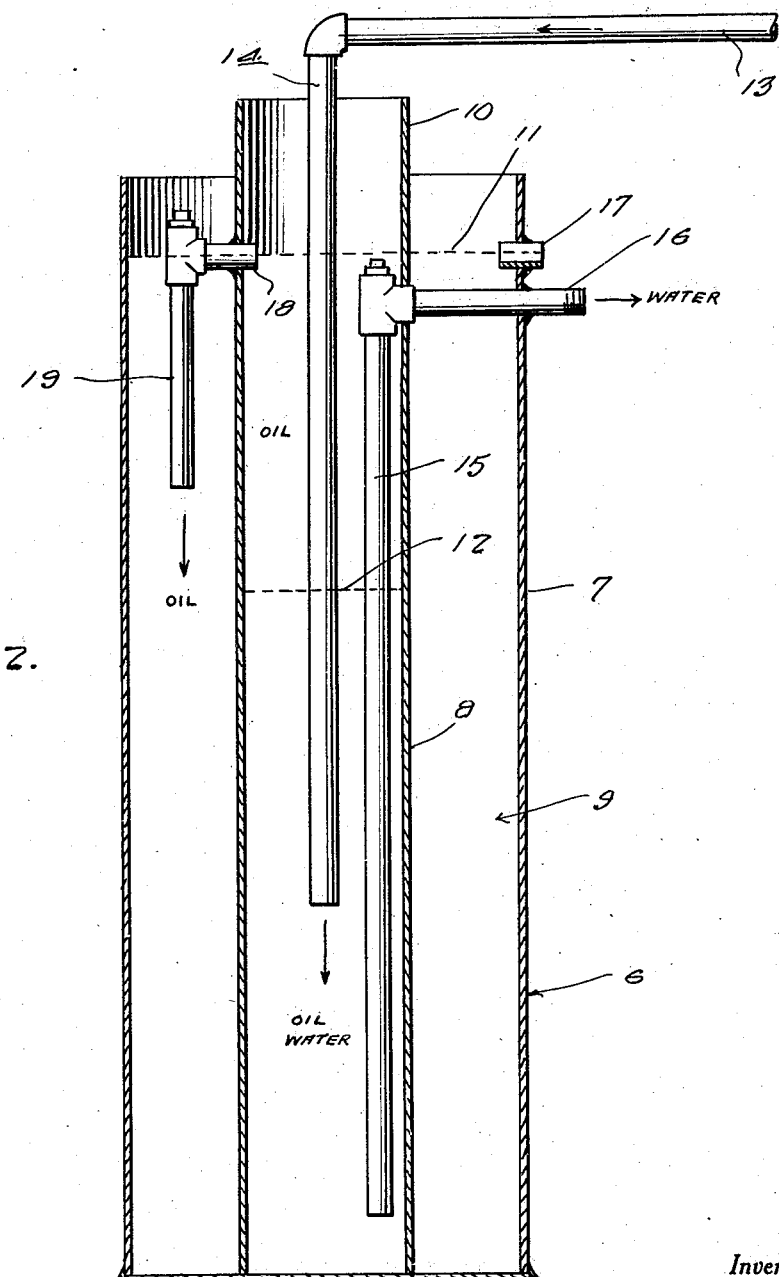
Figure 2 is a view in section and elevation through the separator per se.

In Figure 1, the reference character 4 designates an ordinary oil storage tank having the usual entrance opening in its top.

The improved separator which is arranged centrally therein is generally designated by the reference character 6.

Referring to Figure 2, it will be seen that this separator comprises an outer cylindrical receptacle 7, and an inner cylindrical receptacle 8, defining an annular sustaining and insulating space 9 there-between. The upper end of the inner receptacle extends above the corresponding end of the outer one as indicated at 10. The reference character 11 designates a normal oil level line.

The reference character 13 designates a pipe connected with a depending branch pipe 14, which extends down into the inner receptacle 8 for delivering the mixture of oil and water from the pump (not shown). Also located in this receptacle is a water discharge pipe, whose intake end is close to the bottom of the receptacle. The upper end is connected with an outlet pipe 15, which is in turn connected with a discharge pipe for carrying the water to a suitable source of discharge or deposit. This pipe 16 is located in a plane below an oil overflow and outlet 17. The reference character 18 designates the short overflow pipe connected with the depending branch pipe 19, for permitting the oil originally separated in the receptacle 8 to overflow into the insulating space 9, and which space fills to a column of sufficient height to overflow into tank 4 by way of the overflow or outlet device 17.

It is submitted that the improvement and refinement herein shown and described serves to produce a contribution to this art which, we believe, is an achievement beyond prior art devices.

It has been found that by confining the separator within the oil tank, said separator not being subjected directly to the outside temperature is not likely to freeze or get out of order. Consequently, it operates automatically and without attention. It will thus be seen that the outer tank 7 serves to insulate the inner water tank 8 and in this manner the inner tank is protected during freezing weather.

The piping arrangement embodied in the separator construction is such as to insure proper action and by surrounding the inside of the receptacle with a column of oil, the separating action is seldom, if ever, interfered with even in extremely cold areas. It is further obvious that by separating the water from the oil, the oil containing capacity of the tank is increased, as the water is entirely dispensed with. Further, that by eliminating water from the tank itself, loss of oil is avoided when water is drawn therefrom as was necessary by the old manual method. And finally, by preserving the ground heat of the fluids and thus producing more perfect separation of oil and water, freezing either in the tanks or lines of water or an emulsion of water and oil is entirely eliminated.

These and other advantages and features of the invention have doubtless been made apparent from the description and drawings. Therefore a more lengthy description is regarded as unnecessary.

Minor changes in the shape, size, and rearrangement of details coming within the field of invention claimed may be resorted to in actual practice, if desired.

We claim:

1. In a tank separator of the class described, inner and outer spaced receptacles, an oil overflow pipe affording communication between the ends of said receptacles, an oil overflow and discharge device carried by the outer receptacle and located in a plane with said overflow pipe, and a water discharge pipe leading from the inner receptacle and including an outlet on a plane below said oil overflow pipe.

2. In a tank separator of the class described, inner and outer receptacles spaced apart and defining an inner oil and water separating chamber, and an outer and surrounding oil containing chamber, means for delivering the mixture of oil and water to the inner receptacle, a water discharge pipe in said inner receptacle, having its intake end disposed adjacent the bottom of the receptacle and having a discharge pipe adjacent the upper end of the receptacle, an oil overflow pipe leading from the inner receptacle to the outer receptacle and disposed on a plane above the water discharge pipe, said outer receptacle having an oil discharge located in a plane with said oil overflow pipes.

In testimony whereof we affix our signatures.

JOHN L. DAVITT.
NORMAN K. HANKS.